United States Patent
Kleyn et al.

(10) Patent No.: US 10,079,776 B2
(45) Date of Patent: *Sep. 18, 2018

(54) MANAGING MULTIPLE CARTRIDGES THAT ARE ELECTRICALLY COUPLED TOGETHER

(71) Applicant: HEWLETT PACKARD ENTERPRISE DEVELOPMENT LP, Houston, TX (US)

(72) Inventors: Gerald K. Kleyn, Houston, TX (US); Dwight L. Barron, Houston, TX (US); Paul Anton Santeler, Montgomery, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 165 days.

This patent is subject to a terminal disclaimer.

(21) Appl. No.: 14/941,341

(22) Filed: Nov. 13, 2015

(65) Prior Publication Data

US 2016/0072728 A1    Mar. 10, 2016

Related U.S. Application Data

(63) Continuation of application No. 13/855,986, filed on Apr. 3, 2013, now Pat. No. 9,203,772.

(51) Int. Cl.
| | | |
|---|---|---|
| *G06F 15/177* | (2006.01) | |
| *G06F 1/00* | (2006.01) | |
| *H05K 7/14* | (2006.01) | |
| *H04L 12/927* | (2013.01) | |
| *H04L 12/911* | (2013.01) | |
| *G06F 1/20* | (2006.01) | |
| *G06F 1/32* | (2006.01) | |
| *H04L 29/08* | (2006.01) | |

(52) U.S. Cl.
CPC .............. *H04L 47/803* (2013.01); *G06F 1/00* (2013.01); *G06F 1/20* (2013.01); *G06F 1/3203* (2013.01); *G06F 15/177* (2013.01); *H04L 47/70* (2013.01); *H04L 67/10* (2013.01)

(58) Field of Classification Search
CPC .... H05K 7/14–7/1498; H05K 7/20781; H05K 7/20736; H05K 2201/10159; H05K 5/04; H05K 13/04; H05K 7/18; H05K 7/20; G06F 15/16–15/177; G06F 15/76–15/825
See application file for complete search history.

(56) References Cited

U.S. PATENT DOCUMENTS

| | | |
|---|---|---|
| 5,278,730 A | 1/1994 | Kikinis |
| 5,331,509 A | 7/1994 | Kikinis |

(Continued)

OTHER PUBLICATIONS

Smith, W.E. et al.; Availability Analysis of Blade Server Systems; http://ieeexplore.ieee.org/xpl/articleDetails.jsp?tp=&arnumber=5386524&contentType=Journals+%26+Magazines&queryText%3Dchassis+cluster+server+blades+resource+sharing > On pp. 621-640 , 2008.

*Primary Examiner* — Glenn Allen Auve
(74) *Attorney, Agent, or Firm* — VanCott

(57) ABSTRACT

Managing multiple cartridges that are electrically coupled together includes obtaining general purpose command instructions from a chassis with a cartridge where the cartridge has a unique application and is connected to the chassis and further operating the unique application based on the general purpose command instructions.

14 Claims, 4 Drawing Sheets

(56) References Cited

U.S. PATENT DOCUMENTS

| | | |
|---|---|---|
| 5,539,616 A | 7/1996 | Kikinis |
| 5,568,361 A | 10/1996 | Ward |
| 5,600,800 A | 2/1997 | Kikinis |
| 5,786,984 A | 7/1998 | Bonardi |
| 6,108,199 A | 8/2000 | Bonardi et al. |
| 6,115,242 A | 9/2000 | Lambrecht |
| 6,330,594 B1 * | 12/2001 | Swart .................... G06Q 99/00 709/203 |
| 6,408,199 B1 | 6/2002 | Bonardi |
| 6,469,901 B1 | 10/2002 | Costner |
| 7,418,608 B2 | 8/2008 | Kumar et al. |
| 7,478,177 B2 | 1/2009 | Cherian et al. |
| 7,606,833 B2 | 10/2009 | Shawver et al. |
| 7,610,582 B2 | 10/2009 | Becker et al. |
| 7,730,205 B2 | 1/2010 | Rothman et al. |
| 7,840,656 B2 | 11/2010 | Holdaway et al. |
| 8,108,503 B2 | 1/2012 | Kern et al. |
| 8,112,762 B2 | 2/2012 | Shokawa |
| 8,316,131 B2 | 11/2012 | Sheets et al. |
| 8,484,721 B2 | 7/2013 | Lam et al. |
| 8,549,127 B2 | 10/2013 | Chhuor et al. |
| 8,667,110 B2 | 3/2014 | Groenendaal |
| RE45,140 E | 9/2014 | Chu |
| 8,854,831 B2 | 10/2014 | Arnouse |
| 9,203,772 B2 * | 12/2015 | Kleyn ................... H04L 47/70 |
| 2003/0016504 A1 * | 1/2003 | Raynham ............ G11B 33/126 361/727 |
| 2006/0167886 A1 | 7/2006 | Kantesaria et al. |
| 2011/0153798 A1 | 6/2011 | Groenendaal |
| 2013/0013759 A1 | 1/2013 | Austen et al. |
| 2013/0163185 A1 * | 6/2013 | Gilges ..................... G06F 1/20 361/679.41 |
| 2013/0298183 A1 * | 11/2013 | McGrath ............... G06F 9/455 726/1 |
| 2013/0308265 A1 | 11/2013 | Arnouse |
| 2013/0335907 A1 | 12/2013 | Shaw et al. |

* cited by examiner

MANAGING MULTIPLE CARTRIDGES THAT ARE ELECTRICALLY COUPLED TOGETHER

BACKGROUND

Data centers operate many servers to meet market demands to process data and provide online services. Such servers operate multiple applications in parallel. Often, a single application is run by multiple distributed servers to more efficiently utilize the servers' resources. The total cost of ownership of a data center includes the cost of purchasing the servers and other hardware in the data center, the cost to maintain the servers and other equipment, and the cost of the energy consumption to run the servers and related equipment.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

Figure 1:
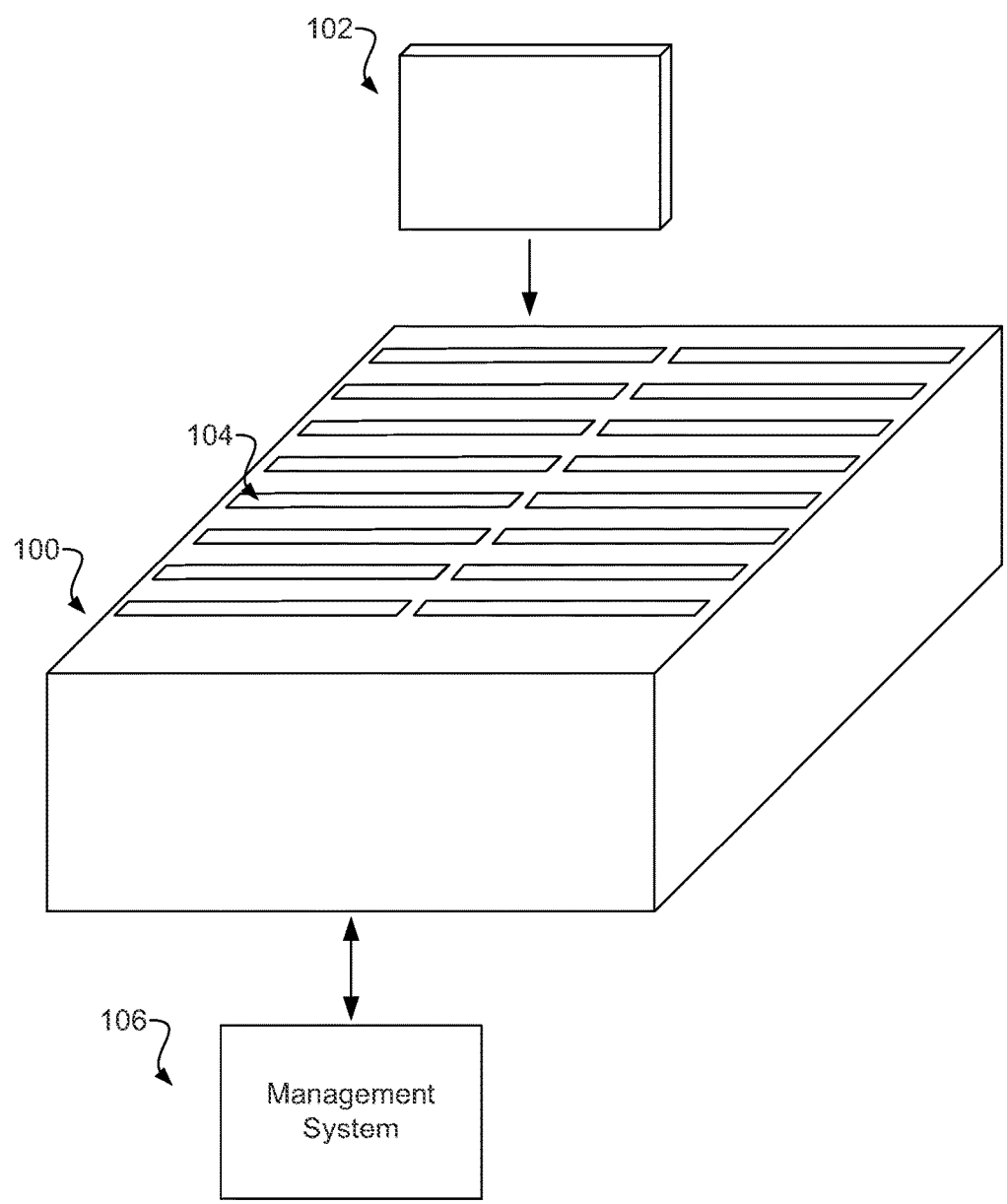
FIG. 1 is a diagram of an example of a chassis with cartridges according to the principles described herein.

Data center operators are using general purpose servers to meet the market's demands. Such general purpose servers are built to support a wide variety of applications with options and features to meet the demands for several markets. General purpose servers initially allowed data center operators an easy way to support a variety of applications on similar hardware, but as hyper-scale applications have emerged, those same servers provide sub-optimal total cost of ownership (performance per dollar per watt).

The principles described herein include using system on a chip (SoC) technology in data centers. The SoC technology operates at a much lower power with much less space and can more quickly be tuned for particular applications due to their building-block nature. The SoC technology creates an opportunity to tune silicon for a particular application which is particularly well suited for hyper-scale applications. The lower power operating abilities of servers built with SoC allow for a higher packaging density of servers into racks of the data center. For example, where a rack was previously able to house tens of units in its rack space, a rack can now house thousands of units in the same rack space. Such densities enable data centers with previously tens of thousands of servers to now scale to millions of servers.

In addition to increasing the scale of the servers in data centers, the principles described herein also include designing servers as cartridges that are connectable into a chassis of a data center rack. These cartridges are application specific, instead of the general purpose servers commonly used in the industry. Also, the cartridges include a minimal number of components, which may include just the processing resources and the memory resources specific to operate the cartridge's unique application. All of the other supportive components for operating the unique applications are built into the chassis. For example, storage components, cooling components, management components, chipset components, power components, and other components can be built into the chassis instead of the cartridges. These supportive components are built with general purpose operating parameters in mind and operate with general purpose code so that a wide variety of application specific cartridges can be operated by the chassis. Thus, the supportive functions of the chassis provide an architecture for operating the applications in such a manner that the cartridges can be inserted into any position of the chassis without consideration of whether a specific position includes specialized hardware to meet the specific application's operating parameters. Such a structure causes the chassis to be processor agnostic because the processors of the cartridges are not forced to have specialized hardware or program instructions to utilize the resources of the chassis.

Such architecture enables the generation of SoC built cartridges that are targeted to specific web scale applications or other types of applications to be rapidly developed on shared infrastructure that supports a large scale of servers. The shared infrastructure can include federated management, network sharing, shared storage, and a cartridge based design that can be tuned for specific applications.

The principles described herein include a method for managing multiple cartridges that are electrically coupled together. Such a method includes obtaining general purpose command instructions from a chassis with a cartridge where the cartridge has a unique application and is connected to the chassis. The method further includes operating the unique application based on the general purpose command instructions.

The principles described herein also include an apparatus for managing multiple unique applications electrically coupled together. Such an apparatus includes a chassis with multiple positions to physically connect to individual cartridges where at least some of the individual cartridges have processing resources to operate an individual unique application. The chassis also includes a management system in communication with a group of the multiple positions and stores general purpose command instructions.

The principles described herein also include a system for managing multiple unique applications electrically coupled together. Such a system includes a management subsystem to send individualized general purpose command instructions to a group of cartridges connected to a chassis. The cartridges have unique processing resources and unique memory resources to operate a unique application. The system also includes an allocation engine to allocate shared resources among the group of cartridges.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

FIG. 1 is a diagram of an example of a chassis (100) with cartridges (102) according to the principles described herein. In this example, the chassis (100) has multiple positions (104) where the cartridges (102) can be inserted into the chassis (100). Insertion into these positions (104) creates a physical connection between the chassis (100) and the cartridges (102) and also an electrical connection between the cartridges (102) and the services of the chassis (100). Such an electrical connection electrically couples the cartridges (102) together in such a manner that the cartridges (102) can share resources from the chassis as wells as communicate with one another.

The chassis (100) is also in communication with a management system (106). The management system (106) may be built into the chassis (100). The management system (106) may include a management subsystem that has a processor and memory resources that allows the management system (106) to send management command instructions to the cartridges. The command instructions may be general purpose program instructions that can cause a wide variety of processors to execute functions. The general purpose nature of the command instructions gives a cartridge engineer flexibility to create the cartridge in a manner that is well suited for the cartridge's specific application. In such a manner, the management system (106) can support cartridges customized for specific applications, which allows for the cartridges to perform at an optimal level. For example, certain processor designs may be ineffective for performing certain applications. As a result of the general purpose command instructions from the management system (106), the cartridge can utilize hardware, cartridge architecture, circuit designs, and other cartridge components that are optimized for the cartridge's unique application. Such optimization provides a high performance application that uses a minimal amount of resources.

The cartridges (102) may be made with system on chip (SoC) technology, which enables the cartridges to use a significantly lower amount of power during the application's operation while being customized for specific unique applications. The customization of the cartridges for specific use applications further reduces the energy consumption during the operation of the applications. However, the design principles of the cartridges (102) and the general purpose management commands allow for future higher performance processing, networking, caching, or storage capabilities in a device agnostic architecture.

The management system (106) may include a single management subsystem to manage a group of cartridges. In other examples, the management system (106) includes multiple management subsystems that each manage a group of cartridges based on the position where the cartridges are connected to the chassis, based on the type of application, based on other characteristic of the cartridges, or combinations thereof. In such an example, the management subsystems may communicate with one another to coordinate management efforts among the different groups or relay messages from cartridges to other management subsystems.

The resources available on the chassis (100) are allocated to the cartridges. Such shared resources may include cooling resources, power resources, storage resources, networking resources, other resources, or combinations thereof. By sharing such resources, the complexity of each cartridge is reduced. The reduction in the cartridges' complexity allows cartridges to be developed quicker, be manufactured quicker, and be less expensive. Further, the redundancy of each cartridge supplying the individual components to meet the cartridge's own demands for such resources reduces inefficiencies and further reduces the costs of manufacturing cartridges.

While this example has been described and depicted in FIG. 1 with a specific number of positions (104), any appropriate number of positions may be incorporated into the chassis according to the principles described herein. For example, cartridges using SoC technology that include just those components that are specific to the cartridge's unique application can be built with a minimal amount of components. As a result, a chassis may include thousands of positions. Initial development of a chassis built according to the principles described herein included over two thousand positions per datacenter rack.

Figure 2:
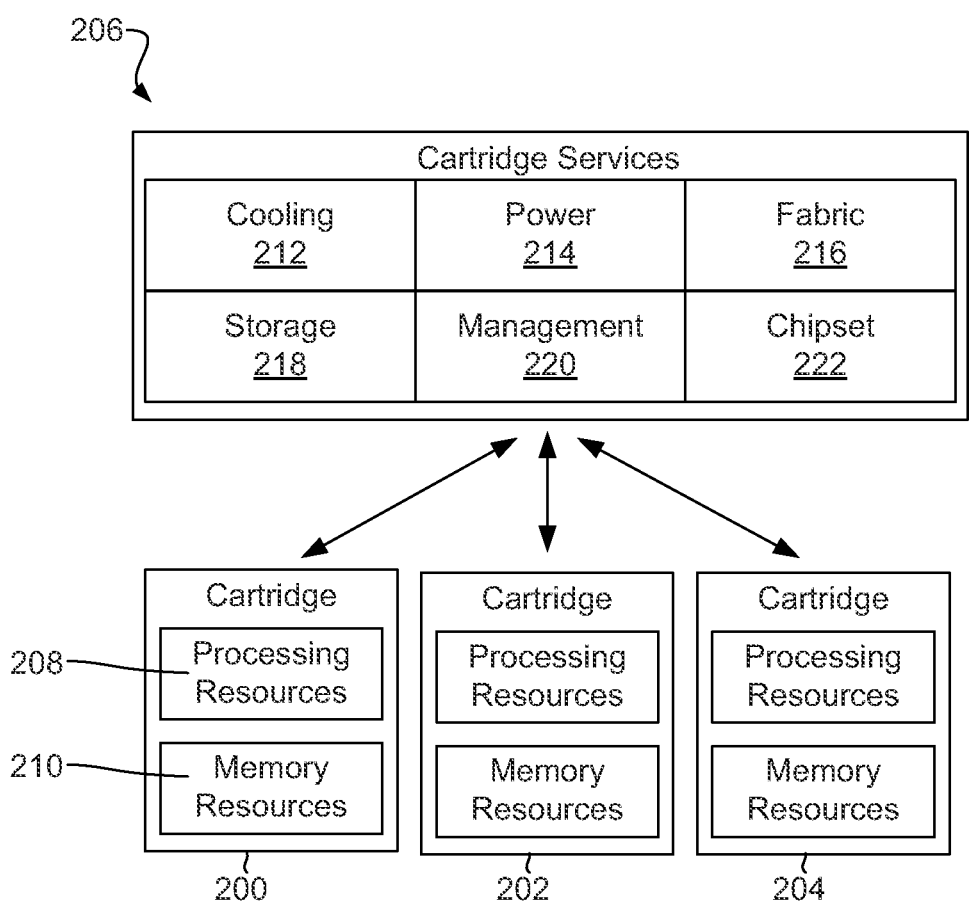
FIG. 2 is a diagram of an example of services for cartridges according to the principles described herein.

FIG. 2 is a diagram of an example of services for cartridges according to the principles described herein. In this example, a first cartridge (200), a second cartridge (202), and a third cartridge (204) are depicted to be in electrical communication with cartridge services (206) of the chassis.

Each of the cartridges (200, 202, 204) have memory resources (208) and processing resources (210). The memory resources (208) may be cache memory, processor memory, local memory, random access memory, non-volatile memory, volatile memory, read only memory, another type of memory, or combinations thereof. The memory resources (208) of the first cartridge may include different types and amounts of memory resources than the memory resources of the other cartridges (202, 204). Likewise, the memory resources of the second cartridge (202) may be different than the processing resources of the first and third cartridges (200, 204). Program instructions may be stored on the memory resources of the cartridges (200, 202, 204) which cause the processing resources (210) to execute a task. While this example has been described with reference to specific types of memory resource, any appropriate type of memory resources may be used in accordance with the principles described herein.

The processing resource may include central processing units, graphic processing units, processing elements, specific purpose processing units, other types of processing units, or combinations thereof. The processing resources (210) may be caused to execute tasks from program instructions stored in the memory resources (208). The processing resources (210) of the cartridge (200) may be different than the processing resources of the other cartridges (202, 204). Likewise, the processing resources of the second cartridge (202) may be different than the processing resources of the first and third cartridges (200, 204). While this example has been described with reference to specific types of processing resources, any appropriate types of processing resources may be used in accordance with the principles described herein.

The memory resources (210) and the processing resources (208) of the cartridges may contain all of the components that are specific for executing the unique application of the cartridge. The remainder of the components to assist operating the unique application is located in the cartridge services (206) of the chassis. The chassis may provide general purpose instruction sets and tools to the processing resources (208) and memory resources (210) of the cartridges such that the cartridge services are processor agnostic. The general purpose instruction sets from the chassis allow for a wide variety of processing and memory design considerations to be implemented in the cartridges while still allowing the cartridges' components to be able to avail themselves of the chassis's services.

One of the services provided by the chassis may include a cooling service (212). A central cooling source located in the chassis may distribute a cooling fluid to the cartridges connected to the chassis. As a result, each cartridge is freed from incorporating its own cooling mechanism. In some examples, the centralized cooling source can selectively distribute cooling fluid to individual cartridges. In other example, cooling engines are distributed throughout the chassis and may selectively cool one or multiple cartridges. The cooling service may include a cooling mechanism that is capable of cooling any cartridge regardless of the specific design parameters of the cartridge's processing resources or memory resources. While this example has been described with reference to specific cooling services and mechanisms, any appropriate cooling services and mechanisms may be used in accordance with the principles described herein.

Another service provided by the chassis may include a power service (214). Upon insertion to a position of the chassis, an electrical power connection may be established between the chassis and the cartridge. The chassis may include a power source or a connection to a power source that provides power to the cartridges. In some examples, the chassis includes power management services for the cartridges as well. For example, the chassis may implement power saving protocols for the cartridges connected to the chassis. In one such example, the chassis may send a cartridge a sleep command when the cartridge's processing resources have been inactive for a predetermined amount of time. In other such examples, the chassis may send a cartridge a wake-up command in response to a request for the services of the cartridge. The chassis may also implement a power reduction command that causes the cartridge's processing resources to implement just core operations when a scarcity of power exists. While this example has been described with reference to specific power services and mechanisms, any appropriate power services and/or mechanisms may be used in accordance with the principles described herein.

A fabric service (216) may also be included in the chassis. The fabric may include interconnected electrically conductive medium that electrically connect cartridges together. The fabric may also provide the electrically conductive medium that electrically connects the cartridges to the management and other services of the chassis. Additionally, the fabric may also enable high bandwidth capabilities as well as parallel processing capabilities. In some examples, the fabric includes interconnected nodes that include processors, memory, and/or peripherals. Such interconnected nodes may provide other networking and storage capabilities. While this example has been described with reference to specific fabric services and mechanisms, any appropriate fabric services and/or mechanisms may be used in accordance with the principles described herein.

A storage service (218) may also be included in the chassis. The chassis may provide the cartridges access to additional memory storage. In such examples, the cartridges may store data relating to their applications in the chassis's storage to reduce and/or eliminate the amount of resources on the cartridge dedicated to storage. The storage may include both volatile and non-volatile memory storage. Thus, the storage may be used for permanent memory storage or be used for temporary storage while the applications of the cartridges are in operation. A specific amount of the chassis's memory may be dedicated to each of the cartridges based on a storage allocation policy. The storage allocation policy may include allocating the storage on a demand basis, a per cartridge basis, a request basis, another basis, or combinations thereof. In some examples, spatial or temporal regions of the chassis's storage are dedicated to specific cartridges. In other examples, the data stored in the chassis's memory is mixed with the data from the other cartridges connected to the chassis.

The storage services (218) may also include at least one level of caches to more quickly retrieve data stored in more permanent types of memory. In some examples, the chassis's memory storage is connected to an external memory storage source to handle storage demands of the cartridges. While this example has been described with reference to specific storage services and mechanisms, any appropriate storage services and/or mechanisms may be used in accordance with the principles described herein.

The chassis may also provide a management service (220). The management service (220) may include instruction sets that govern operational aspects, maintenance aspects, administrative aspects, and other aspects of operating the unique applications embodied in the cartridges. The management service (220) may also include network functions, such as security functions, allocation functions, communication protocols, authorization procedures, error checking, load balancing, other services that affect the application's workflow, other management services, or combinations thereof. The management commands from the management subsystem of the chassis are provided in a general purpose format that makes no or lithe assumptions about the processing resources. In such a manner, a wide variety of cartridges regardless of how they are programmed will be able to implement the management service's commands. While this example has been described with reference to specific management services and mechanisms, any appropriate management services and/or mechanisms may be used in accordance with the principles described herein.

The chassis may also provide a chipset service (222). The chipset service (222) may include instructions that manage dataflow between the processing resources and memory resources of the cartridge. In some examples, the chipset manages communications between the processing resources of the cartridges and the other shared services of the chassis. While this example has been described with reference to specific chipset services and mechanisms, any appropriate chipset services and mechanisms may be used in accordance with the principles described herein.

While this example has been described with reference to specific services provided by the chassis, any appropriate type of service may be provided in accordance with the principles described herein. For example, the chassis may also provide switching services, security services, control services, other services, or combinations thereof. At least one of the services is implemented in a processor agnostic manner with general purpose instruction sets and tools so that a wide variety of processing resource configurations can take advantage of the chassis's services.

Figure 3:
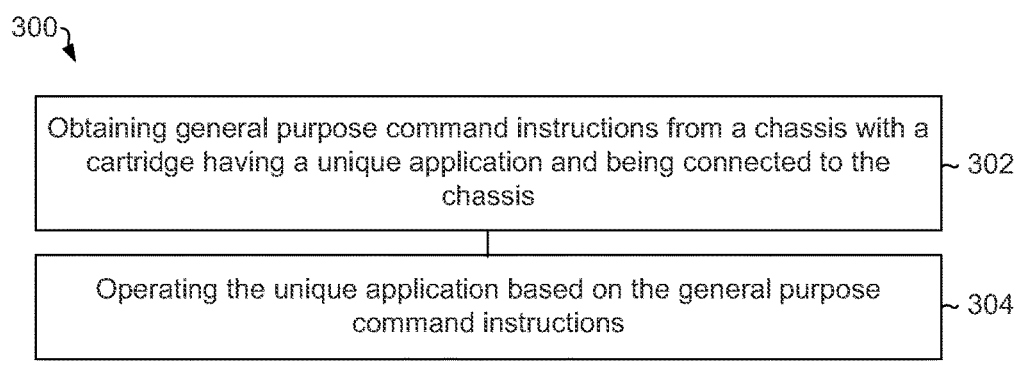
FIG. 3 is a diagram of an example of a method for managing multiple unique applications electrically coupled together according to the principles described herein.

FIG. 3 is a diagram of an example of a method (300) for managing multiple unique applications electrically coupled together according to the principles described herein. In this example, the method (300) includes obtaining (302) general purpose command instructions from a chassis with a cartridge having a unique application and being connected to the chassis and operating (304) the unique application based on the general purpose command instructions.

The command instructions may be program instructions stored in memory of the chassis, instruction sets, instructions, code, or combinations thereof. The cartridges may include just those components that are customized for the specific application of the cartridge, while the remaining components and program instructions are located or stored in the chassis. The cartridges can be built using SoC technology to reach a high performance while keeping the energy consumption low. By removing those components from the cartridge that are not application specific to the chassis, the cartridges have a minimal amount of components and resources. In this manner, the cartridges can be designed and handled efficiently, which further reduces power consumption. The chassis can service such cartridges by using the general purpose instructions which makes no assumptions about the processor's unique designs. Overall, such a system allows for a significant reduction in the overall cost of ownership.

The designs and layouts of the cartridges are specific for the cartridge's unique applications. The chassis uses the general purpose instructions to run the unique configurations of each of the cartridges. In this manner, a wide variety of unique applications are well suited for the principles described herein. Such applications that may be compatible with the principles described herein include dedicated hosting applications, modular disk sharing applications, web front end applications, memory caching applications, web accelerator applications, dynamic web applications, high density dynamic web applications, other applications, or combinations thereof.

The method may include operating the unique application regardless of which position the cartridge is connected to the chassis. Because the chassis's services are processor agnostic, the position in which a cartridge is inserted into the chassis may not affect the cartridge's ability to avail itself of the chassis's services. Each of the cartridges may include unique processing resources to operate the unique application of the cartridge. Likewise, each cartridge may have unique memory resources. These processing and memory resources can be different from the other resources of the other cartridges also connected to the chassis. While such cartridges are unique for their specific applications, the chassis provides services to each of the cartridges. The chassis makes lithe or no assumptions about each cartridge's designs by using general purpose code to instruct the resources of the cartridges. As a result, the cartridges can share common resources. Such common resources may include a cooling resource, a storage resource, a chipset resource, a power resource, a management resource, a fabric resource, or combinations thereof.

Due to keeping just those components that are unique to the specific application on the cartridge, the chassis can include over a thousand positions for the insertion of cartridges. Further, the same principles further reduce the power consumption of each of the cartridges while their applications are running due reductions of unnecessary resource redundancies and simplified cartridge designs. As a result, the chassis is also able to support operations of the thousands of cartridges simultaneously.

Figure 4:
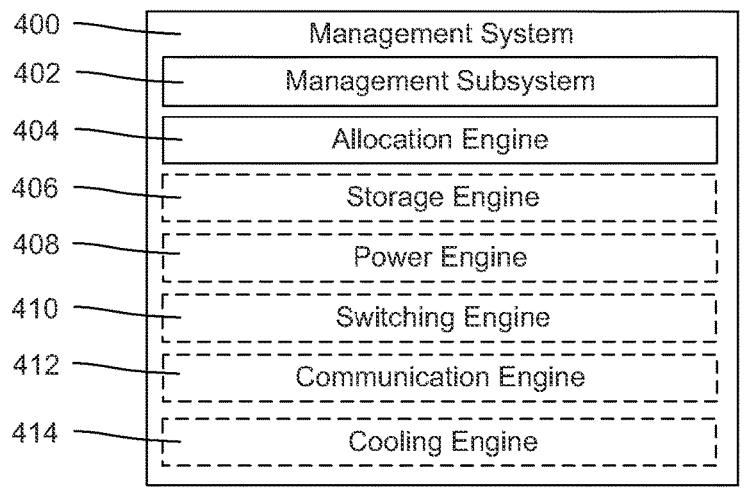
FIG. 4 is a diagram of an example of a management system according to the principles described herein.

FIG. 4 is a diagram of an example of a management system (400) according to the principles described herein. The management system (400) includes a management subsystem (402) and an allocation engine (404). In this example, the management system (400) also includes a storage engine (406), a power engine (408), a switching engine (410), a communications engine (412), and a cooling engine (414). The subsystems and engines (402, 404, 406, 408, 410, 412, 414) refer to a combination of hardware and program instructions to perform a designated function. Each of the subsystems and/or engines (402, 404, 406, 408, 410, 412, 414) may include a processor and memory. The program instructions are stored in the memory and cause the processor to execute the designated function of the engine.

The management subsystem (402) sends management command instructions to the cartridges for managing the cartridge's application. The allocation engine (404) allocates the shared resources of the chassis among the cartridges. The storage engine (406) provides storage services to the cartridges, and the power engine (408) provides power services to the cartridges. The switching engine (410) provides switching services to the cartridges, and the communications engine (412) provides communication services to the cartridges. The cooling engine (414) provides cooling services to the cartridges. While this example has been described with reference to specific engines that provide services to the cartridges, any appropriate engine to provide any appropriate type of service to the cartridges may be used in accordance with the principles described herein.

Figure 5:
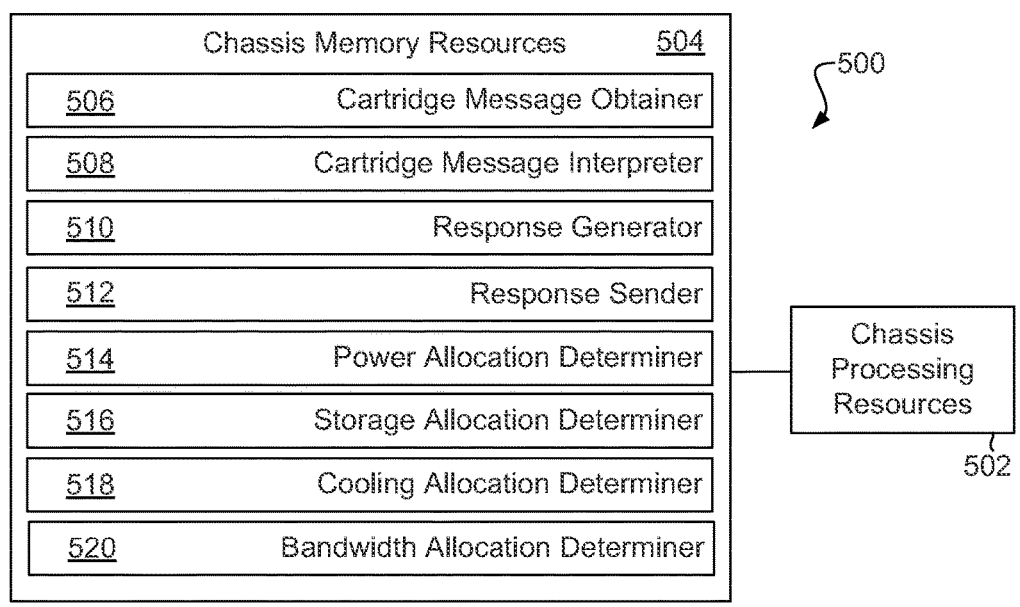
FIG. 5 is a diagram of an example of a management system according to the principles described herein.

FIG. 5 is a diagram of an example of a management system (500) according to the principles described herein. In this example, the management system (500) includes processing resources (502) that are in communication with memory resources (504). Processing resources (502) include at least one processor and other resources used to process programmed instructions. The memory resources (500) represent generally any memory capable of storing data such as programmed instructions or data structures used by the management system (500). The programmed instructions shown stored in the memory resources (504) include a cartridge message obtainer (506), a cartridge message interpreter (508), a response generator (510), a response sender (512), a power allocation determiner (514), a storage allocation determiner (516), a cooling allocation determiner (518), and a bandwidth allocation determiner (520).

The memory resources (504) include a computer readable storage medium that contains computer readable program code to cause tasks to be executed by the processing resources (502). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, magnetic storage media, other types of memory, or combinations thereof.

The cartridge message obtainer (506) represents programmed instructions that, when executed, cause the processing resources (502) to obtain a message from a cartridge. The chassis may receive the message passively from the cartridge, or the chassis may actively retrieve the message from the cartridge. Some types of messages may be received passively from the cartridge, while other types of messages are actively retrieved by the chassis.

The cartridge message interpreter (508) represents programmed instructions that, when executed, cause the processing resources (502) to interpret the message from the cartridge. The response generator (510) represents programmed instructions that, when executed, cause the processing resources (502) to generate an appropriate response to the message. The response is written in a general purpose format because the response generator makes little or no assumptions about the processing resources in the cartridge. In this manner, the response can be understood with a wide variety of design conditions in the cartridge. The message sender (512) sends the message to the appropriate cartridge.

The power allocation determiner (514) represents programmed instructions that, when executed, cause the processing resources (502) to allocate the amount of power to each of the cartridges connected to the chassis. The storage allocation determiner (516) represents programmed instructions that, when executed, cause the processing resources (502) to allocate the amount of storage available to the cartridges. The cooling allocation determiner (518) represents programmed instructions that, when executed, cause the processing resources (502) to allocate the amount of cooling resources to dedicate to the cartridges. The bandwidth allocation determiner (520) represents programmed instructions that, when executed, cause the processing resources (502) to allocate the amount of bandwidth to each of the cartridges.

Further, the memory resources (504) may be part of an installation package. In response to installing the installation package, the programmed instructions of the memory resources (504) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (502) and the memory resources (504) are located within the same physical component, such as a server, or a network component. The memory resources (504) may be part of the physical component's main memory, caches, registers, non-volatile memory, or elsewhere in the physical component's memory hierarchy. Alternatively, the memory resources (504) may be in communication with the processing resources (502) over a network. Further, the data structures, such as the libraries and may be accessed from a remote location over a network connection while the programmed instructions are located locally. Thus, the management system (500) may be implemented on a user device, on a server, on a collection of servers, or combinations thereof.

The management system (500) of FIG. 5 may be part of a general purpose computer. However, in alternative examples, the management system (500) is part of an application specific integrated circuit.

While these above examples have been described with reference to specific types and components of a chassis, any appropriate type of chassis or components of the chassis may be used in accordance with the principles described herein. Further, while the examples above have been described with reference to specific mechanisms for attaching the cartridges to the chassis, any appropriate mechanism for connecting the cartridges to the chassis may be used in accordance with the principles described herein.

Further, while the examples above have been described with reference to specific types of cartridges, any appropriate type of cartridge may be used in accordance with the principles described herein. For example, the cartridges may be built with SoC technology, another type of technology, or combinations thereof. Further, while the examples have been described with reference to specific types of services available to the cartridges through the chassis, any appropriate type of service may be provided through the cartridge in accordance with the principles described herein. Further, while the above mentioned services have been described with reference to specific mechanisms for implementing those services, any appropriate mechanism for implementing any appropriate service may be used in accordance with the principles described herein. Also, the examples above have been described with reference to specific mechanisms for making the chassis processor agnostic, any appropriate mechanism for making the chassis processor agnostic may be used in accordance with the principles described herein.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for managing multiple cartridges that are electrically coupled together, comprising:
   obtaining general purpose command instructions from a chassis, which chassis houses application specific cartridges that include just processing resources and memory resources to operate a unique application corresponding to a cartridge;
   sending the general purpose command instructions to a number of the application specific cartridges; and
   providing, through the chassis, access to shared resources to multiple application specific cartridges.

2. The method of claim 1, further comprising electrically coupling multiple application specific cartridges to communicate with one another.

3. The method of claim 1, wherein an application specific cartridge is customized for a specific application.

4. The method of claim 1, further comprising sending general purpose instructions to the chassis to provide the shared resources to the multiple application specific cartridges.

5. An apparatus for managing multiple cartridges that are electrically coupled together, comprising:
   a chassis with multiple positions to physically connect to individual cartridges where at least some of the individual cartridges comprise processing resources to operate an individual unique application; and
   the chassis comprising a management system in communication with a group of the multiple positions and comprising general purpose command instructions.

6. The apparatus of claim 5, wherein said cartridges are servers.

7. The apparatus of claim 5, wherein different individual cartridges comprise different types of memory resources.

8. The apparatus of claim 5, wherein different individual cartridges comprise different types of processing resources.

9. The apparatus of claim 5, wherein the management system supports multiple types of cartridges without regard to which of the multiple positions the cartridges are positioned.

10. A system for managing multiple cartridges that are electrically coupled together, comprising:
    a management subsystem to send individualized general purpose command instructions to a group of cartridges connected to a chassis where the cartridges comprise unique processing resources and unique memory resources to operate a unique application; and
    an allocation engine to allocate shared resources among the group.

11. The system of claim 10, wherein:
    a cartridge comprises just those processing resources and memory resources to operate a unique application; and
    all other resources are built into the chassis.

12. The system of claim 10, further comprising multiple management subsystems, wherein each management subsystem sends individualized general purpose instructions to a different group of cartridges.

13. The system of claim 12, wherein the different groups of cartridges are based on a type of application associated with the cartridges.

14. The system of claim 10, wherein multiple management subsystems communicate with one another.

* * * * *